United States Patent Office 3,131,189
Patented Apr. 28, 1964

3,131,189
PREPARATION OF QUATERNARY AMMONIUM BETAINE SALTS
Donald L. Klass, Barrington, Ill., assignor to The Pure Oil Company, Palatine, Ill., a corporation of Ohio
No Drawing. Filed Oct. 16, 1961, Ser. No. 145,464
20 Claims. (Cl. 260—279)

This invention relates to new and useful improvements in methods for preparing organic sulfur compounds having the structure of an inner salt, or zwitterion, or betaine. In particular, this invention is concerned with the reaction of carbyl sulfate, or homologues or derivatives thereof, with tertiary amines in a reaction environment free from active-hydrogen-containing compounds, to produce betaine compounds which are useful as intermediates in the preparation of detergents and other useful compounds.

Carbyl sulfate, also known as ethionic anhydride, has been known in the chemical literature since 1838. See Ann. Pharm. 25, 32–47 (1838). Carbyl sulfate has been reported to react with primary and secondary amines to form novel thiamides, (Ebel, U.S. Patent 2,666,788, or British Patent 686,061), but has not been reported to undergo the reaction or produce the products of this invention.

It is one object of this invention to provide a new and improved process for the preparation of betaine compounds from carbyl sulfate and its homologues and derivatives.

Another object of this invention is to provide an improved process for the preparation of betaine compounds from carbyl sulfate and tertiary amines.

A feature of this invention is the provision of an improved process for the preparation of organic inner salts, or betaines, by reaction of carbyl sulfate, or its homologues or derivatives, with a tertiary amine.

Other objects and features of this invention will become apparent from time to time throughout the specification and claims as hereinafter related.

This invention is based upon my discovery that carbyl sulfate, or substituted forms of carbyl sulfate containing hydrocarbon substituents or other non-reactive substituents, can be reacted with a tertiary amine, such as pyridine, quinoline, acridine, trimethylamine, dimethyl aniline, etc., in a reaction environment free from active-hydrogen-containing compounds to yield a betaine compound.

Carbyl sulfate is a very reactive compound which is prepared by reaction of sulfur trioxide with ethylene in a 2:1 mol ratio. The reaction may be carried out in solution or in the vapor phase, usually at room temperature or lower, to avoid charring. Carbyl sulfate has the formula,

Derivatives of carbyl sulfate are known in which one or more of the hydrogen atoms on the ethylene portion of the ring are substituted with alkyl, aryl, alkaryl, aralkyl, or cycloalkyl radicals, which may be free of other substituents or which may contain non-reactive substituents. These derivatives of carbyl sulfate are generally prepared in a similar manner, i.e., by reaction of 2 mols of sulfur trioxide with 1 mol of the corresponding unsaturated compound. Thus, the reaction of propylene with sulfur trioxide produces a methyl derivative of carbyl sulfate. The reaction of α-dodecene with sulfur trioxide produces a decyl derivative of carbyl sulfate. Styrene can be reacted with sulfur trioxide to produce a phenyl derivative of carbyl sulfate, although extreme care is required in carrying out the reaction to prevent polymerization of the styrene. If sulfur trioxide is reacted with a cycloalkene, such as cyclohexene, a derivative of carbyl sulfate is obtained in which two of the hydrogen atoms are substituted by a bridging radical. These various derivatives of carbyl sulfate are also generally operative in carrying out this invention and have the general formula,

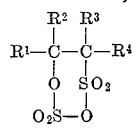

where $R^1$, $R^2$, $R^3$, and $R^4$ are the same or different, and are either hydrogen or hydrocarbon radicals, such as alkyl, aryl, alkaryl, aralkyl, or cycloalkyl.

In carrying out this invention, carbyl sulfate, or a derivative thereof, is reacted with a tertiary amine in a reaction environment free from active-hydrogen-containing compounds. Where the amine is liquid, it can be reacted with the carbyl sulfate, or derivative thereof, in the absence of a solvent. Where the tertiary amine is solid or is immiscible with the carbyl sulfate, it is preferred to use an inert solvent, or at least an inert liquid reaction medium, to facilitate contact between the reactants. Where the reactants are immiscible, it is desirable to carry out the reaction with considerable agitation. The reaction is preferably carried out in the presence of an inert liquid or an inert solvent for the reactants which contains no active hydrogen for reaction with the carbyl sulfate. The reaction environment, therefore, must be free of water, alcohols, acids, primary or secondary amines, etc., which contain active hydrogen atoms which could react with the carbyl sulfate. The reaction can be carried out at room temperature, or at elevated temperatures depending upon the particular reactants used and the presence or absence of a solvent or liquid reaction medium. In the case of the reaction of pyridine with carbyl sulfate, the reaction occurs spontaneously at room temperature and may even require cooling to prevent undue violence of reaction. On the other hand, highly substituted derivatives of carbyl sulfate and other tertiary amines may require the use of slightly elevated temperatures.

Where the reaction is carried out using an inert solvent, it is usually sufficient to dissolve the reactants separately in the solvent and mix the solutions, whereupon the desired product precipitates. Where the reaction takes place more slowly, it is sufficient to supply only enough heat to reflux the solution to effect reaction. The inert solvent is defined as one which is unreactive toward either of the reactants or the reaction product. Inert solvents which can be used in this process are characterized by low hydrogen-bonding ability and a solubility parameter in the range from about 9.3 to 10.6. The solubility parameter is a term developed by Hildebrand and discussed in detail, in Hildebrand and Scott, Solubility of Nonelectrolytes, 3rd Edition, Reinhold Publishing Corp. (1949). The use of the solubility parameter in prediction of solubility characteristics of various solvents is developed by Burrell in Solubility Parameters for Film Formers, Official Digest, 27, 727–758 (1955). Solvents which fall within the above definition with regard to solubility parameter and hydrogen-bonding ability and which are inert in the reaction include the following: chloroform, capronitrile, pentachloroethane, chlorobenzene, tetrahydronaphthalene, 1,1,2-trichloroethane, dichloroethyl ether, ethylene dichloride, o-dichlorobenzene, nitrobenzene, 1,2-dibromoethane, butyronitrile, and α-bromonaphthalene. Additionally, mixtures of solvents can be used which have low hydrogen-bonding ability and a solubility parameter in the aforementioned range, even though the individual solvents in the mixture are not solvents for the reactants in this process. For example, neither carbon tetrachloride nor methylene iodide is a solvent which can be used in this reaction, but a mixture of equal parts by volume of these solvents can be used in this process. Similarly, a mixture of dibromoethane and chloroform is superior as a solvent to either of these solvents alone when used in this process.

When this reaction is carried out, the carbyl sulfate ring is broken and 1 mol of $SO_3$ is displaced from the molecule in the form of a tertiary amine-sulfur trioxide complex, leaving a betaine compound. The reaction which takes place is in accordance with the equation,

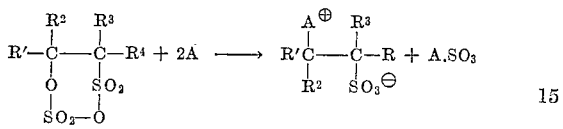

where $R^1$, $R^2$, $R^3$, and $R^4$ are hydrogen or hydrocarbon radicals, and A is a tertiary amine. As is apparent from this equation, the reaction requires 2 mols of the tertiary amine per mol of carbyl sulfate to go to completion. Of course, smaller proportions of the amine can be used, but the reaction is incomplete.

The following non-limiting examples are illustrative of the scope of this invention.

EXAMPLE I

Three grams of carbyl sulfate were dissolved in 30 ml. of ethylene dichloride as solvent, and treated with 1.5 g. of pyridine in 10 ml. of ethylene dichloride. The reaction was highly exothermic and a precipitate formed immediately. The solvent and unreacted pyridine were decanted from the precipitate which was semi-solid in character. The precipitate was covered with petroleum ether (B.P. 30–60° C.) and cooled, thereupon the semi-solid material became granular. The petroleum ether was decanted from the solid.

The granular solid was dissolved in hot dimethyl formamide, yielding a yellow solution. Upon cooling, heavy crystals formed from the solution. These crystals were filtered to obtain a crude product which appeared to contain some sulfur trioxide as pyridine complex because it gave a positive test for sulfate, an acidic solution in water, and a light-yellow color when treated with aqueous base (this yellow color appears to be characteristic of pyridine-sulfur trioxide adducts).

The crude product was recrystallized from dimethyl formamide to obtain a crystalline product having a melting point of 250–255° C. This product gave a neutral solution in water, a negative test for sulfate ion, even when warmed with acid (indicating a direct C—S linkage), and no color with base. The infrared spectrum for this compound was compared with the spectrum of known betaine compounds and indicated the presence of the carbon-pyridine grouping and the $C-SO_3^\ominus$ grouping. The elemental analysis corresponded closely with the calculated analysis for the product as follows:

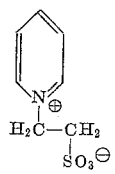

| Element | Calculated, Percent wt. | Found, Percent wt. |
|---|---|---|
| Carbon | 44.91 | 41.83 |
| Hydrogen | 4.85 | 5.79 |
| Nitrogen | 7.48 | 7.30 |
| Sulfur | 17.13 | 18.50 |

EXAMPLE II

When 18.8 g. of carbyl sulfate are dissolved in 100 ml. of ethylene dischloride as solvent, and treated with 30 g. of quinoline dissolved in 50 ml. of ethylene dichloride, the reaction is mildly exothermic and a precipitate is formed rapidly. The solvent and unreacted amine are decanted from the precipitate and the precipitate is recovered and treated as in Example I. The precipitate which is obtained is a crystalline material having the high melting point characteristic of betaine compounds. The product produced in this reaction has the structure,

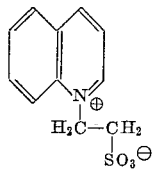

EXAMPLE III

When 18.8 g. of carbyl sulfate are dissolved in 100 ml. of ethylene dichloride as solvent and treated with 35.8 g. of acridine dissolved in 50 ml. of ethylene dichloride, the reaction is mildly exothermic and a precipitate is formed rapidly. The solvent and unreacted amine are decanted from the precipitate and the precipitate is recovered and treated as in Example I. The precipitate which is obtained is a crystalline material having the high melting point characteristic of betaine compounds. The product produced in this reaction has the structure:

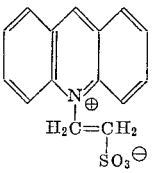

EXAMPLE IV

When 18.8 g. of carbyl sulfate are dissolved in 100 ml. of ethylene dichloride as solvent and treated with 17.7 g. of trimethyl amine dissolved in 50 ml. of ethylene dichloride, the reaction is mildly exothermic and a precipitate is formed rapidly. The solvent and unreacted amine are decanted from the precipitate and the precipitate is recovered and treated as in Example I. The precipitate which is obtained is a crystalline material having the high melting point characteristic of betaine compounds. The product produced in this reaction has the structure:

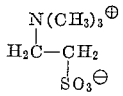

EXAMPLE V

When 18.8 g. of carbyl sulfate are dissolved in 100 ml. of ethylene dichloride as solvent and treated with 36.3 g. dimethyl aniline dissolved in 100 ml. of ethylene dichloride, and the reaction mixture is refluxed for 30 minutes, a precipitate is formed. The solvent and unreacted amine are decanted from the precipitate and the precipitate is recovered and treated as in Example I. The precipitate which is obtained is a crystalline material having the high melting point characteristic of betaine compounds. The product produced in this reaction has the structure:

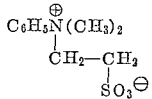

EXAMPLE VI

When other tertiary amines and carbyl sulfate, or derivatives of carbyl sulfate, are reacted, either alone or in solution in an inert solvent (the reaction medium must be free from active hydrogen containing compounds), analogous betaine compounds are formed, as shown in Table I.

Table I

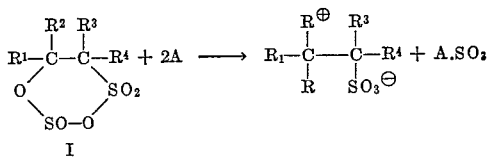

| Carbyl Sulfate Reactant | Tertiary Amine (A) | Solvent | Product |
|---|---|---|---|
| φ—CH—CH₂ with O, SO₂, SO₂—O ring | pyridine | 1,1,2-trichloroethane. | pyridinium, φCH—CH₂, SO₃⁻ |
| C₂H₅CH—CH₂ with O, SO₂, SO₂—O ring | (C₂H₅)₃N | pentachloroethane. | N(C₂H₅)₃⁺, C₂H₅CH—CH₂, SO₃⁻ |
| CH₃CH—CHCH₃ with O, SO₂, SO₂—O ring | pyridine | ethylene dichloride. | pyridinium, CH₃CH—CHCH₃, SO₃⁻ |
| (CH₃)₂C—C(CH₃)₂ with O, SO₂, SO₂—O ring | φN(CH₃)₂ | chlorobenzene. | φN(CH₃)₂⁺, (CH₃)₂C—C(CH₃)₂, SO₃⁻ |

While this invention has been described with emphasis on several preferred embodiments, it will be obvious to those skilled in the art that the reaction described herein is a general reaction which is applicable to carbyl sulfate and its derivatives and tertiary amines. While the specific examples have been directed primarily to the reactions of tertiary amines with carbyl sulfate and lower homologues of carbyl sulfate, it should be understood that this reaction is one which is characteristic of the heterocyclic ring structure of the carbyl sulfate molecule and is not influenced by the presence of inert substituents in the molecule. Thus, this reaction will take place with derivatives of carbyl sulfate in which the hydrogen atoms have been replaced with one or more inert hydrocarbon or substituted-hydrocarbon radicals. The carbyl sulfate compounds are highly reactive and active-hydrogen-containing compounds must be excluded from the reaction environment. While the reaction has been disclosed as applicable to tertiary amines such as pyridine, quinoline, acridine, trimethylamine, dimethyl aniline, and triethylamine, it is obvious to those skilled in the art that the reaction will proceed generally with tertiary amines. Tertiary amines in general will displace one mol of sulfur trioxide from the carbyl sulfate (or carbyl sulfate derivative) to form a betaine compound of the type described and a tertiary amine-sulfur trioxide complex as a by-product. The class of compounds prepared by the reaction is well-known in the art, but such compounds have never been prepared by the process described and claimed herein.

While I have described my invention fully and completely with special emphasis upon several preferred embodiments, I wish it to be understood that within the scope of the appended claims this invention may be practiced otherwise than as specifically described herein.

The embodiments of the invention in which an exclusive property or privilege is claimed are defined as follows:

1. The method of preparing betaine salts of the formula

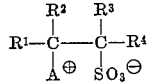

wherein $R^1$, $R^2$, $R^3$ and $R^4$ are members of the group consisting of hydrogen, alkyl, aryl, aralkyl, cycloalkyl and cycloalkyl formed by joining two alkyl groups attached to the adjacent carbon atoms in said formula and $A^{\oplus}$ consists in a tertiary amine containing only tertiary nitrogen, which consists in reacting as the sole reactants about 1 mol of a carbyl sulfate of the formula

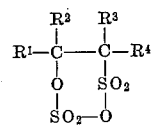

wherein $R^1$, $R^2$, $R^3$ and $R^4$ are as above defined, with about 2 mols of said tertiary amine A in an inert reaction environment.

2. The method in accordance with claim 1 in which tertiary amine A is an amine of the group consisting of pyridine, quinoline, acridine, trimethylamine, triethylamine and dimethyl aniline.

3. The method in accordance with claim 1 in which $R^1$, $R^2$, $R^3$ and $R^4$ are hydrogen.

4. The method in accordance with claim 1 in which said reaction is conducted in an inert solvent, characterized by low hydrogen-bonding power and a solubility parameter of about 9.3 to 10.5 and at a temperature in the range of about room temperature to the reflux temperature of the solution.

5. The method in accordance with claim 4 in which said solvent is member of the group consisting of chloroform, capronitrile, pentachloroethane, chlorobenzene, tetrahydronaphthalene, 1,1,2-trichloroethane, dichloroethyl ether, ethylene dichloride, o-dichlorobenzene, nitrobenzene, 1,2-dibromoethane, butyronitrile, α-bromonaphthalene, equal volume mixtures of carbon tetrachloride and methylene iodide and equal volume mixtures of dibromoethane and chloroform.

6. The method in accordance with claim 5 in which said solvent comprises a mixture of about equal parts by volume of dibromoethane and chloroform.

7. The method in accordance with claim 5 in which said solvent comprises a mixture of about equal volumes of carbon tetrachloride and chloroform.

8. The method in accordance with claim 1 in which $R^1$ is phenyl and $R^2$, $R^3$ and $R^4$ are hydrogen and said tertiary amine A is pyridine.

9. The method in accordance with claim 1 in which $R^1$ is ethyl and $R^2$, $R^3$ and $R^4$ are hydrogen and said tertiary amine A is triethylamine.

10. The method in accordance with claim 1 in which $R^1$ and $R^4$ are methyl and said tertiary amine A is pyridine.

11. The method in accordance with claim 1 in which $R^1$, $R^2$, $R^3$ and $R^4$ are methyl and said tertiary amine A is dimethyl aniline.

12. The method of preparing a betaine salt of the formula:

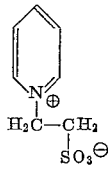

which consists in reacting as the sole reactants about 1 mol of carbyl sulfate with about 2 mols of pyridine in ethylene dichloride solution.

13. The method of preparing a betaine salt of the formula

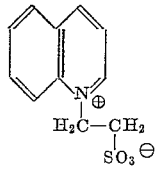

which consists in reacting as the sole reactants about 1 mol of carbyl sulfate with about 2 mols of quinoline in ethylene dichloride solution.

14. The method of preparing a betaine salt of the formula

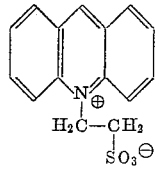

which consists in reacting as the sole reactants about 1 mol of carbyl sulfate with about 2 mols of acridine in ethylene dichloride solution.

15. The method of preparing a betaine salt of the formula

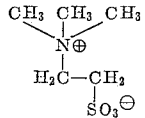

which consists in reacting as the sole reactants about 1 mole of carbyl sulfate with about 2 moles of trimethylamine in ethylene dichloride solution.

16. The method of preparing a betaine salt of the formula

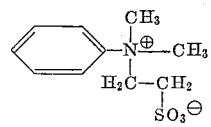

which consists in reacting as the sole reactants about 1 mol of carbyl sulfate with about 2 mols of dimethyl aniline in ethylene dichloride solution.

17. The method of preparing a betaine salt of the formula

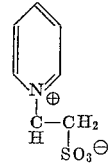

which consists in reacting as the sole reactants about 1 mole of 2-phenyl carbyl sulfate with about 2 mols of pyridine in a 1,1,2-trichloroethane solution.

18. The method of preparing a betaine salt of the formula

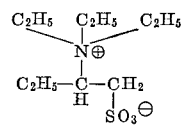

which consists in reacting as the sole reactants about 1 mol of 2-ethyl carbyl sulfate with about 2 moles of triethylamine in a pentachloroethane solution.

19. The method of preparing a betaine salt of the formula

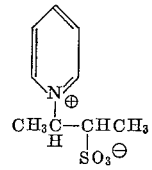

which consists in reacting as the sole reactants about 1 mol of 1,2-dimethyl carbyl sulfate with about 2 mols of pyridine in an ethylene dichloride solution.

20. The method of preparing a betaine salt of the formula

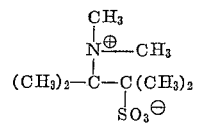

which consists in reacting as the sole reactants about 1 mol of 1-dimethyl, 2-dimethyl carbyl sulfate with about 2 mols of dimethyl aniline in a chlorobenzene solution.

References Cited in the file of this patent

UNITED STATES PATENTS 2,666,788    Ebel _____ Jan. 19, 1954

FOREIGN PATENTS 446,337    Great Britain _____ Apr. 17, 1936
811,964    Great Britain _____ Apr. 15, 1959

OTHER REFERENCES

Manecke et al.: I, Chemische Berichte, vol. 85, pp. 160–2 (1952), QD 1 D4.

Manecke et al.: II, Angew. Chem., vol. 70, pp. 745–6 (1958), QD 1Z5.